US012769884B1

(12) United States Patent
Upadhyayula

(10) Patent No.: US 12,769,884 B1
(45) Date of Patent: Oct. 20, 2026

(54) PRIVACY-PRESERVING MULTI-TOUCH ATTRIBUTION SYSTEM

(71) Applicant: INTUIT INC., Mountain View, CA (US)

(72) Inventor: Indira Sneha Upadhyayula, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 19/346,338

(22) Filed: Sep. 30, 2025

(51) Int. Cl.

| | |
|---|---|
| ***H04L 9/32*** | (2006.01) |
| ***G06F 21/31*** | (2013.01) |
| ***G06F 21/62*** | (2013.01) |

(52) U.S. Cl.
CPC .......... *G06F 21/6254* (2013.01); *G06F 21/31* (2013.01)

(58) Field of Classification Search
CPC ............................. G06F 21/6254; G06F 21/31
See application file for complete search history.

(56) References Cited

U.S. PATENT DOCUMENTS

| | | | | |
|---|---|---|---|---|
| 9,203,905 | B1 * | 12/2015 | Hong | H04L 67/14 |
| 10,296,934 | B2 * | 5/2019 | Ahuja | G06Q 30/0241 |
| 2013/0066750 | A1 * | 3/2013 | Siddique | G06Q 20/12 705/27.2 |
| 2018/0144350 | A1 * | 5/2018 | Mazak | G06Q 30/0201 |
| 2022/0131769 | A1 * | 4/2022 | Dille | G06F 11/3476 |

* cited by examiner

*Primary Examiner* — Phy Anh T Vu
(74) *Attorney, Agent, or Firm* — Patterson + Sheridan, LLP

(57) ABSTRACT

Aspects of the present disclosure relate to systems and protocols for cross-channel tracking and attribution in software environments. User identifiers may be stitched across devices, sessions, and channels based on network and/or device information. Based on the stitching, the complete history of a user's interactions with the software platform may be tracked. Accordingly, an attribution graph may be generated based on the stitching. The attribution graph may include weights for each channel based on the user's interactions with the software environment. Interventions may be performed with respect to the software environment based on the weights. For example, channels with low weights may be identified, and maintenance may be performed on the channels. As another example, channels with high weights may be deployed at higher frequencies. Because the stitching and attribution is performed without invasive technologies such as cookies, system security may be enhanced.

20 Claims, 5 Drawing Sheets

| Session ID | IP Address | Time | Channel | Event |
|---|---|---|---|---|
| anon_user_1 | XX.XXX.XX.XXX | 8:00 AM | Advertisement A | Visit |
| anon_user_2 | YY.YYY.YY.YYY | 8:15 AM | Advertisement B | Visit |
| verified user 1 | XX.XXX.XX.XXX | 9:04 AM | Organic Search | Authentication |
| verified user 1 | XX.XXX.XX.XXX | 9:08 AM | Direct | Purchase |
| verified user 2 | YY.YYY.YY.YYY | 9:45 AM | Organic Search | Authentication |
| anon_user_5 | ZZ.ZZZ.ZZ.ZZZ | 10:00 AM | Advertisement C | Visit |

FIG. 3

PRIVACY-PRESERVING MULTI-TOUCH ATTRIBUTION SYSTEM

INTRODUCTION

Aspects of the present disclosure relate to techniques and systems for privacy-preserving multi-touch attribution. In particular, embodiments disclosed herein allow for stitching user interaction data across multiple sessions and devices in order to generate an attribution graph for various user interaction channels. The graph may be generated without relying on invasive and unsecure trackers such as cookies.

BACKGROUND

In many cases, the host of a software platform may track user interaction data to effectively maintain the platform. For example, if the interaction data shows that users frequently perform a target action (such as continuing to use a software platform) after interacting with a channel (such as a webpage), this may indicate that the channel is functioning as intended. However, if the interaction data shows that users rarely perform the target action after interacting with the channel (e.g., if the users stop using the software platform after interacting with the channel), this may indicate performance issues with the channel. Accordingly, user interaction data plays an important role in identifying and correcting performance issues in computing systems. User interaction data also plays an important role in evaluating how different channels contribute to user milestones and conversions, enabling optimization of resources in a privacy-preserving way. By analyzing the full sequence of user interactions, systems can determine which channels are most effective at guiding users toward significant actions, such as authentication or completion of a process.

However, due to privacy and security concerns, comprehensive user interaction data is often impractical to obtain. For example, existing techniques for tracking user interactions may involve the use of cookies, which are files saved on a user device that share information about the user. To prevent user information from being obtained by malicious parties, devices and browsers are often configured to restrict the use of cookies or even block the cookies entirely. When these cookies are blocked, it may be impossible to track the interactions of users across the different channels of the software platform. For instance, the various actions performed by a single user may not be attributed to the user due to security protocols that block cookies. As a result, it may be impossible to determine that the user navigated the various channels of a platform until stopping at a channel with a performance issue. Thus, using existing techniques, it may be impossible to identify certain software performance issues and improve the software platform.

As a result, there is a need in the art for improved techniques for cross-channel tracking and attribution.

BRIEF SUMMARY

Certain embodiments provide a method. The method generally includes: receiving data associated with an anonymous user identifier from a first channel, the data associated with the anonymous user identifier comprising first user contextual information; receiving data associated with an authenticated user identifier from a second channel, the data associated with the authenticated user identifier comprising second user contextual information; and generating a channel-milestone attribution graph based on stitching the anonymous user identifier to the authenticated user identifier based on the first user contextual information and the second user contextual information, wherein the channel-milestone attribution graph comprises attribution weights for a channel associated with a user origin and attribution weights for a channel associated with a target goal.

Other embodiments provide processing systems configured to perform the aforementioned method as well as those described herein; non-transitory, computer-readable media comprising instructions that, when executed by one or more processors of a processing system, cause the processing system to perform the aforementioned method as well as those described herein; a computer program product embodied on a computer readable storage medium comprising code for performing the aforementioned method as well as those further described herein; and a processing system comprising means for performing the aforementioned method as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIG. 3 depicts an example of user interaction data related to cross-channel tracking and attribution.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and computer-readable mediums for cross-channel tracking and attribution.

According to some embodiments, data associated with anonymous user identifiers is received from multiple channels. The data may include data related to the device the user is using to access a software platform, such as device type, device model, context device identifier, browser type, operating system, internet protocol (IP) address, and/or the like. The data may include data from the same user across multiple channels, devices, and sessions. The data may be stitched to data associated with an authenticated user identifier. The authenticated user identifier may be an identifier for a user that has an authenticated profile on the software platform. Stitching the anonymous user data to the authenticated user data may allow for accurately determining the user's interaction history with respect to the software platform. A channel-milestone attribution graph that indicates a user origin and a target goal, or milestone, may be generated based on the stitching. For example, the graph may identify the channel through which the user was introduced to the software platform, and the graph may identify channels that contributed to a milestone being achieved. In some embodiments, the attribution graph comprises attribution weights for each of the channels. Based on the attribution graph, interventions may be performed with respect to the channels. For example, channels that are bottlenecks that cause users to stop interacting with the software platform may be identified and repaired based on the attribution graph.

Embodiments of the present disclosure provide numerous technical and practical effects and benefits. For example, by accurately stitching user data across various channels, sessions, and/or devices, the attribution graphs disclosed herein allow for accurately and comprehensively mapping a user's interactions with a software platform. Additionally, because the attribution graphs track user interactions across channels, the performance of the channels may be thoroughly monitored to identify performance issues. As a result, any performance issues may be quickly detected and resolved, resulting in significant performance improvements to the software platform. Furthermore, embodiments disclosed herein allow for accurately tracking user interactions without the need for invasive technologies such as cookies. Accordingly, accurate tracking may be achieved even when cookies are blocked entirely, thereby overcoming a technical problem with prior techniques that rely on such cookies. Furthermore, eliminating the need for cookies improves the security of the software platform by removing the security risks that arise when cookies are improperly managed.

Figure 1:
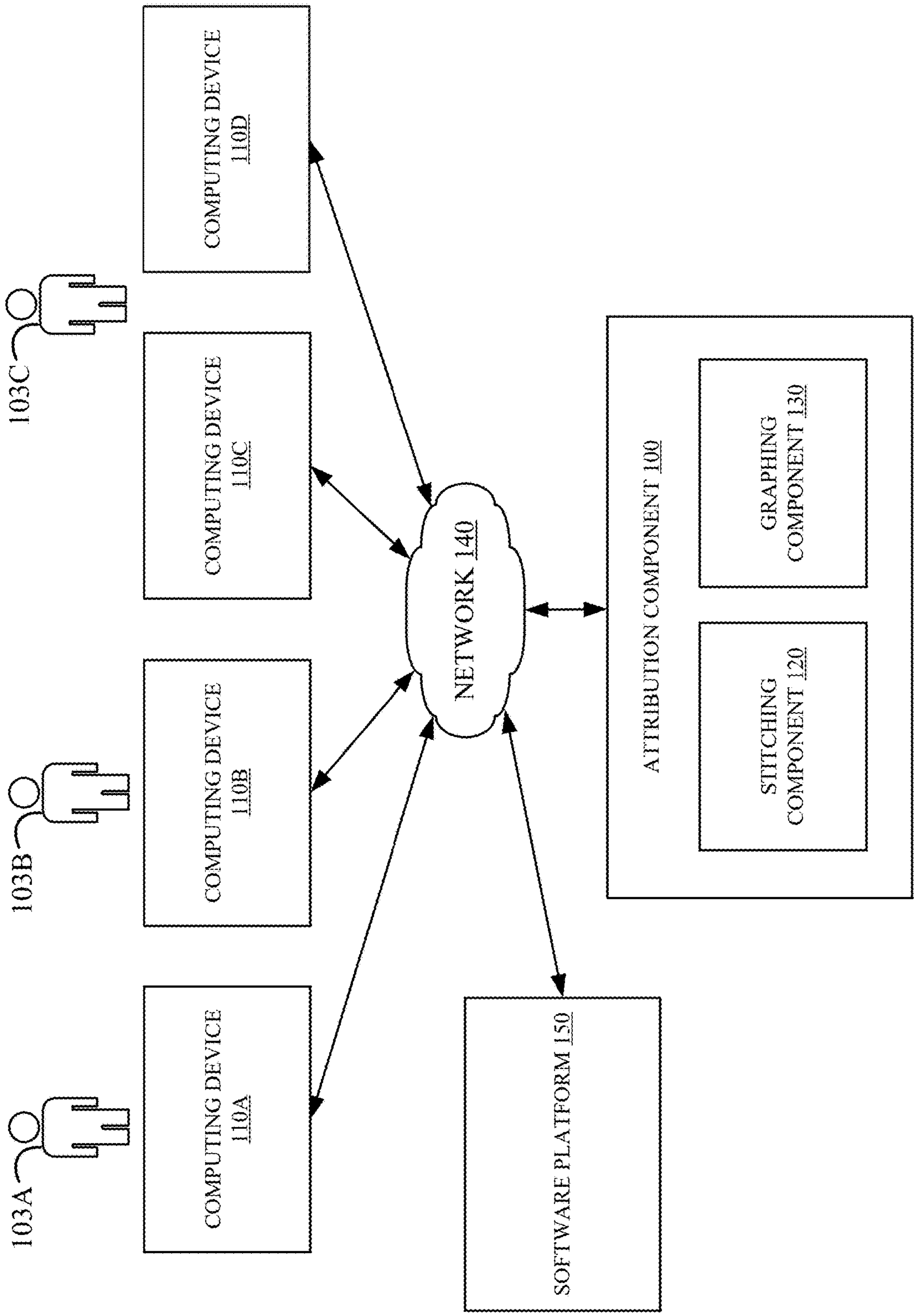
FIG. 1 depicts an example of computing components related to cross-channel tracking and attribution.

Example of Computing Components Related to Cross-Channel Tracking and Attribution FIG. 1 depicts an example of computing components related to cross-channel tracking and attribution.

As shown in FIG. 1, multiple users 103A-C use computing devices 110A-D to interact with a software platform 150. The software platform 150 may include one or more software applications and/or websites. Channels of the software platform 150 may include any type of interactable web entity such as advertisements for the software platform 150 as well as fields, pages, interactable elements, and/or the like that may be included in the software platform 150 or linked to the software platform 150. The software platform 150 and its channels may be located remotely with respect to the computing devices 110A-D and the attribution component 100. As shown in FIG. 1, the software environment 150, attribution component 100, and the computing devices are communicatively coupled via a network 140. In certain embodiments, the network is the internet 140.

Computing devices 110A-D may be any type of computing device that a user may use to access the software platform 150. As shown in FIG. 1, user 103A uses computing device 110A to access the software platform 150. User 103B uses computing device 110B to access the software platform 150. User 103C uses computing devices 110C and 110D to access the software platform 150. Computing devices 110C and 110D may be devices that are connected to the internet (e.g., network 140) via the same internet connection. For example, computing device 110C may be a smartphone that belongs to user 103C, and computing device 110D may be a laptop computer that belongs to the user 103C. Computing devices 110C and 110D may each be connected to the network 140 via an internet router located in the home of the user 103C. As a result, computing devices 110C and 110D may each be associated with a common internet protocol (IP) address or another common identifier. Because computing devices 110A and 110B are connected to the network 140 via different internet connections, these devices may be associated with different identifiers (e.g., the IP address associated with device 110A may be different from the IP address associated with computing devices 110C and 110D).

Users 103A-C may interact with the software platform 150 via the channels of the software platform 150. For example, user 103C may begin interacting with the software platform 150 by clicking on an advertisement that links to the software platform 150 via a smartphone that belongs to user 103C (e.g., computing device 110C). Then, user 103C may move to a laptop or desktop computer (e.g., computing device 110D) to log in to a profile on the software platform 150. The advertisement is an example of a channel of the software platform 150. The web link the user located via an organic search (e.g., a web browser search) and used to access the software platform 150 via computing device 110D is another example of a channel of the software platform 150.

An attribution component 100 implemented using one or more processors of a computing system may be used to generate an attribution graph for the channels of the software platform 150. The attribution component 100 as depicted in FIG. 1 includes a stitching component 120 and a graphing component 130. The stitching component 120 may be used to stitch data associated with the users 103A-C. For example, the stitching component 120 may stitch the data from computing device 110C to data from computing device 110D. The stitching may be based on the computing devices 110C and 110D being connected to the network 140 via the same internet connection and thus sharing a common IP address (or other network identifier). Since the data corresponds to the same user or household, the data may be stitched to a single identifier. Similarly, data from multiple interactions with the software platform 150 on the same device (or a different device) may be stitched as well. For example, user 103A may interact with the software platform 150 by clicking on a link via a web browser on the computing device 110A. Afterwords, the web browser may be closed and cookies on the computing device 110A may be deleted (or, cookies may be blocked entirely). Then, the user 103A may access the software platform 150 in a subsequent browser session. The stitching component 120 may stitch the data associated with user 103A from both sessions to a common identifier for user 103A based on each session being associated with the same device or the same network connection. For example, the stitching may be based on the IP address for the network connection of computing device 110A (or another network identifier) and/or a device identifier (e.g., a media access control (MAC) address of computing device 110A) associated with computing device 110A.

The term "household" refers to a group of users who share a common network environment or device resources, such that their interactions with an application can be associated through shared identifiers. Specifically, a "household" is typically identified by a common network attribute, such as an internet protocol (IP) address, which is assigned to a residential internet connection or local area network used by multiple individuals residing together.

For example, if several members of a family use different devices (such as smartphones, tablets, or computers) to access a website or application from the same home internet connection, their visits may be associated with the same IP address. In this scenario, the system may treat these users as belonging to the same "household" for the purposes of stitching visitor identification records and customizing the user experience.

After the data for each user 103A-C is stitched to the respective identifiers for each user 103A-C, the graphing component 130 may generate an attribution graph for each channel based on the stitched data. The attribution graph may indicate channels that are associated with user origins (e.g., channels through which a user first interacts with the software platform 150). The attribution graph may also indicate channels that are associated with milestones (e.g., milestones may include a user creating an account, authenticating, re-authenticating, making a purchase, continuing use of the software platform 150, and/or the like). For example, the attribution graph may include attribution weights for each channel. The weights may be relatively high (and/or increased by a relatively large amount) for channels associated with a user origin or a milestone. Weights for intermediate channels between the origin channels and the goal channels in the graph may have weights that are relatively lower (and/or increased by a relatively smaller amount). The attribution graph may also indicate bottleneck channels. For example, if a channel is frequently the last channel that users who did not reach a milestone interacted with, the channel may be identified as a bottleneck. Bottleneck channels may be channels that have performance issues that cause users to leave the software platform 150. Weights for a channel may be decreased if the channel is determined to be a bottleneck.

The attribution graph may also indicate channels that contribute less effectively to milestone progression. Channels that consistently receive low attribution weights across stitched journeys may be deprioritized, ensuring resources are directed to more effective channels. In certain embodiments, channels that consistently receive low attribution weights across stitched journeys may be deprioritized for budget allocation or campaign emphasis.

Attribution weights for a channel may be adjusted dynamically based on how user journeys progress to or fail to progress to defined milestones (e.g., authenticate, re-authenticate, purchase). When the upstream identity graph mutates-such as when anonymous sessions are later stitched to an authenticated identifier-attribution is recalculated for that identifier. The recalculation redistributes credit across the milestone nodes and then propagates updated weights to the connected channel edges. This ensures attribution reflects the evolving structure of the user journey while preserving privacy, rather than relying on static last-touch or first-touch assignments.

Based on the attribution graph generated by the graphing component 130, interventions may be performed with respect to channels to optimize user engagement and improve platform performance. For example, if the attribution graph identifies a channel as a bottleneck (such as a channel where users frequently disengage before reaching a milestone) technical interventions may include allocating additional processor resources to a channel to reduce latency, flagging a channel for debug testing or reconfiguration, removing a channel from deployment and replacing the channel, modifying the channel's user interface, updating content, or adjusting the flow of the channel. Channels with high attribution weights may be prioritized for additional deployment or used to replace poor-performing channels.

In some embodiments, the interventions may include adjusting campaign budgets, reallocating media spend, updating targeting strategies, or emphasizing channels with higher attribution weights. Channels that consistently receive higher weights may be prioritized for additional deployment, while channels with lower weights may be deprioritized. Based on the attribution graph generated by the attribution engine, interventions may be performed at the marketing or campaign level to optimize user engagement and channel return-on-investment. For example, channels with consistently low attribution weights across milestones may be deprioritized for resources (e.g., computing resource and/or budget) allocation, while channels with high weights may be prioritized for resource investment. Because attribution is recalculated dynamically upon identity-graph mutations, these optimizations reflect both anonymous and authenticated interactions, ensuring decisions are based on a complete and privacy-preserving view of the user journey.

Figure 2:
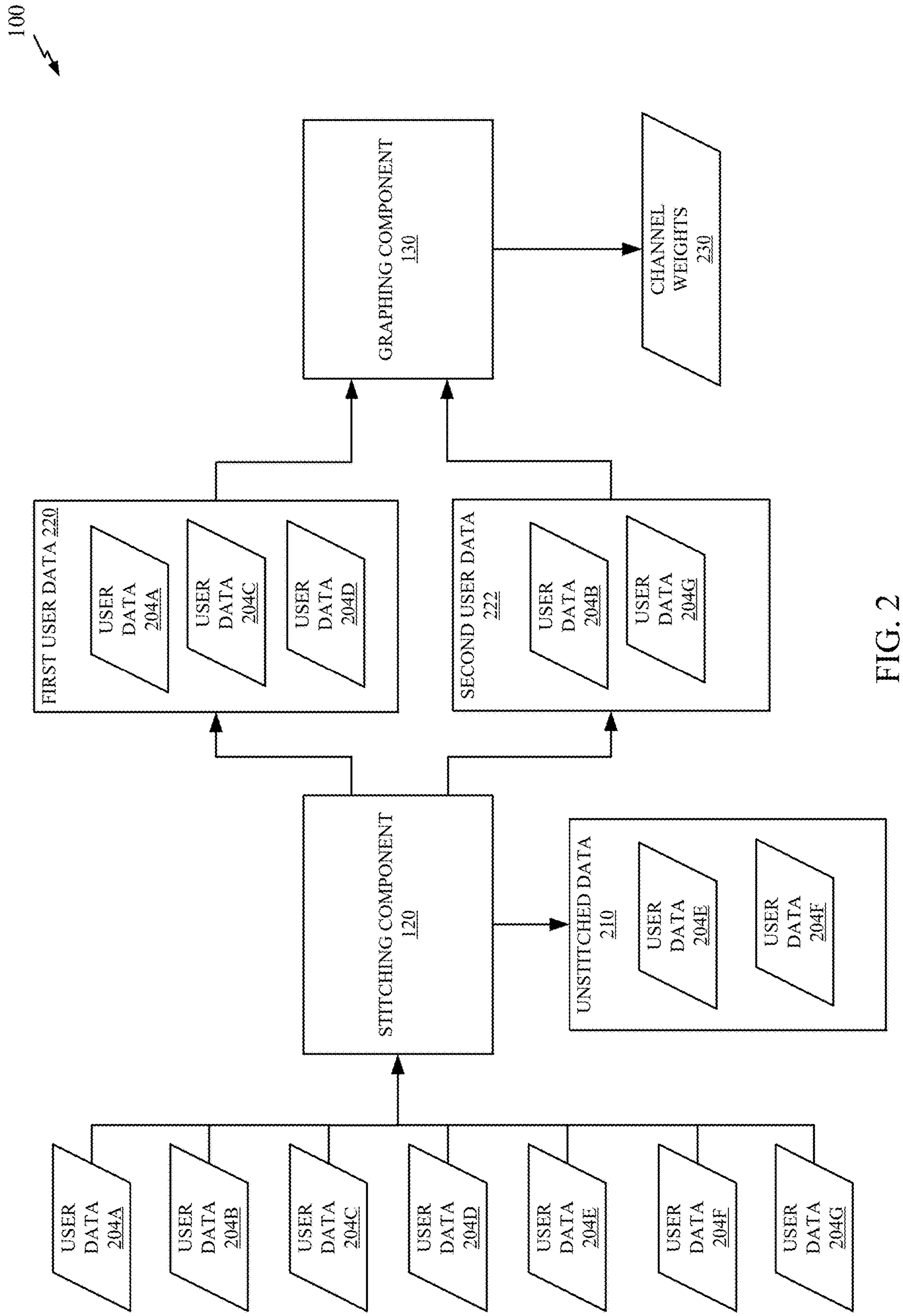
FIG. 2 depicts an additional example of computing components related to cross-channel tracking and attribution.

FIG. 2 depicts an additional example of computing components related to cross-channel tracking and attribution. In particular, FIG. 2 depicts functionality associated with attribution component 100 of FIG. 1.

As shown in FIG. 2, user data 204A-G is transmitted to stitching component 120. Stitching component 120 may stitch the user data 204A-G to user identifiers that are associated with the user to whom the data corresponds. In this example, the stitching component 120 has stitched user data 204A, 204C, and 204D to an identifier for a first user. This first user data 220 is all data that is associated with the first user. For example, user data 204A may be data associated with the first user interacting with an advertisement to access the software platform for the first time. User data 204A may include a timestamp of the user interaction. User data 204C may be data associated with the first user clicking on a link to the software platform. The link may have been retrieved via an internet search performed via a web browser. User data 204D may be data associated with the first user clicking on a link (the same link or a different link) to access the software platform a third time. User data 204D may indicate that the user reached a milestone (e.g., completing a purchase, creating an account, signing in to an account, and/or the like).

The first user data 220 may be stitched based on identifiers within the data. For example, user data 204A and 204C may include the same network identifier (e.g., IP address). User data 204C and 204D may include the same device identifier (e.g., MAC address). Based on the common identifier, user data 204A, 204C, and 204D are each stitched to the identifier for the first user.

User data 204B and 204G (the second user data 222) are stitched to an identifier for a second user (e.g., based on network and/or device identifiers found in user data 204B and 204G). User data 204B may indicate that the second user accessed the software platform by a different advertisement than the advertisement with which the first user interacted. User data 204G may indicate that the second user accessed the software platform a second time but did not complete/reach a milestone or subsequently access the software platform.

Unstitched data 210 may represent data that stitching component 120 was unable to stitch. Data may be unstitched if there is insufficient information to stitch the data. For example, user data 204E may be user data that is associated with network and/or device identifiers that are not shared with any other user data. User data 204E may be stored until sufficient information to stitch the data is obtained (e.g., until data is received that contains the same device/network identifier as found in user data 204E), at which point the data may be stitched.

In some embodiments, data is unstitched if there is too much data that corresponds to the network identifier of the data. For example, user data 204F may share a network identifier with a large number of different user data instances, indicating that the user associated with user data 204F accessed the software platform via a public network connection or a network connection otherwise accessed by many different users. Network data from such networks may not be useful for stitching, since this data does not help to determine which user of the many users is associated with the data. According to some embodiments, stitched data may be modified to remove the stitch if it is determined that the network used to stitch the data was a public network or a network accessed by many different users.

The stitched data (first user data 220 and second user data 222) is then used by the graphing component to generate a channel-milestone attribution graph for the channels based on the stitched data. Each graph is anchored on key milestones (e.g., authenticate, re-authenticate, purchase) associated with the stitched identifier. For example, the stitched user journey may show that a user was introduced via a paid advertisement, later returned through organic search, and eventually authenticated through an interactable element on the website. In this case, attribution weights are assigned across the milestones: the advertisement receives weight for contributing to the initial visit that led to authentication, the organic search receives weight for sustaining engagement, and the interactable element receives weight for being the channel through which authentication occurred. If the identity graph later mutates (e.g., anonymous and authenticated sessions are merged), attribution weights for the affected stitched identifier are recalculated dynamically, redistributing milestone credit and propagating updated weights to the corresponding channel edges. This ensures attribution reflects the complete and evolving user journey while preserving privacy by using metadata-only channel tagging.

As shown in FIG. 2, the attribution graph includes channel weights 230, which are weights for each of the channels that are based on the stitched data. For example, the first user data 220 may indicate that the first user was introduced to the software platform via a first advertisement and then found a website associated with the software platform via an internet search before returning to the website a second time via a link or other interactable element to create a profile. Without the stitching, each of these user interactions may appear to be isolated interactions by separate users. With the stitching, however, the graphing component 130 is able to determine that each interaction represents the progression of a single user toward the milestone of creating a profile. The graphing component 130 may assign weights to each of the channels based on this determination. For example, the advertisement, which represents the origin of the user's interactions with the software platform, may be assigned a relatively high weight based on the advertisement being the user origin. Or, in cases where the advertisement was previously assigned a weight, the previously assigned weight may be increased by a relatively large amount. The web search used to find the website may be assigned a weight that is relatively lower, since the web search was not the origin and the user did not reach the milestone after the web search. Or, in cases where the web search was previously assigned a weight, the previously assigned weight may be increased by a relatively smaller amount. For the interactable element that the user used to visit the website a second time and reach the milestone, a relatively large weight may be assigned (or a previously assigned weight may be increased by a relatively large amount). This is because the interactable element is associated with the milestone (meaning that the session in which the user used the interactable element to reach the website is the session in which the milestone was reached).

Continuing the above example, the second user data 222 may indicate that a second user interacted with the software platform via two channels on two separate occasions but never completed/reached a milestone. For example, user data 204B may correspond to the user interacting with the platform via a first channel and user data 204G may correspond to the user interacting with the platform via a second channel at a later date/time. The second user data 222 may indicate that the second user never reached/completed a milestone. Based on this, the first channel and second channel may be assigned relatively low weights (e.g., weights that are lower than weights for channels that are associated with a user that completed the milestone. Or, in cases where the channels were previously assigned weights, the weights may be decreased.

In one embodiment, the weights for each channel can be assigned using a U-based model. In this model, channels that are closer to the target event and the origin are given higher weights, while channels that are further away from the target event and the origin are given relatively lower weights compared to channels that are closer to the origin and target. This approach emphasizes the influence of the initial and final touchpoints in the user journey. However, weights for every channel along a chain of user interactions that led to a milestone being reached/performed may be increased.

In another embodiment, a Markov chain can be used to determine the weights for each channel. The Markov chain models the probability of a user transitioning from one channel to another along the user journey. The weights are then assigned based on the observed transition probabilities between channels, allowing the system to capture the likelihood that a particular channel contributes to the user reaching a milestone or milestone. This probabilistic approach enables more nuanced attribution by considering the entire sequence of channel interactions.

Markov chains may be used to model the user's progression through various channels as a series of probabilistic transitions. Each channel is represented as a state, and the transitions between states are determined by the observed behavior of users as they interact with different channels. By analyzing these transition probabilities, the system can identify which channels are most influential in guiding users toward milestones, such as authentication or profile creation. This approach allows the attribution system to account for complex user journeys that may involve multiple touchpoints and varying paths, resulting in a more accurate and privacy-preserving assessment of channel effectiveness.

Markov chains can be utilized to generate weights for each channel by first constructing a transition matrix that represents the probability of moving from one channel to another based on observed user journeys. The system analyzes the stitched user data to evaluate the frequency of transitions between channels and calculates the transition probabilities. By simulating user journeys through the Markov chain, the system can estimate the likelihood that a user will reach a milestone from each channel. The weight assigned to each channel is then determined by the channel's contribution to successful transitions leading to milestones, such as authentication or purchase. This approach allows the system to assign weights that represent the influence of each channel in the context of all possible user paths, rather than relying solely on static or position-based models.

By leveraging the stitching component 120 and graphing component 130, the system achieves robust multi-touch attribution without relying on personally identifiable information or cookies, adhering to modern privacy regulations such as the General Data Protection Regulation (GDPR) and the California Consumer Privacy Act (CCPA).

Based on the channel weights 230, interventions may be performed with respect to the channels. For example, if a channel is identified as a bottleneck based on having a weight that is below a threshold, additional resources may be allocated to the channel (to prevent latency and other performance issues), the channel may be reconfigured, a debugging process may be initiated, and/or the like. Channels with higher weights may be deployed more frequently and channels with lower weights may be deployed less frequently. For example, a computing system that is configured to route advertisements to users may be automatically reconfigured based on the channel weights 230. Thus, the advertisements routed by the computing system may be routed based on the channel weights 230.

Stitching user identifiers is a foundational process that enables the generation and dynamic updating of the channel-milestone attribution graph. When user interaction data is received from multiple channels, each interaction may initially be associated with a distinct anonymous or authenticated identifier. The stitching component 120 analyzes contextual information such as device identifiers, network attributes, and session metadata to determine when multiple identifiers correspond to the same user or household. Once this determination is made, the system merges the associated data into a single stitched identifier, representing a unified user profile that spans multiple sessions, devices, and/or channels.

This unified stitched identifier serves as the anchor for constructing the channel-milestone attribution graph. The graph aggregates all channel interactions and milestone events associated with the stitched profile, enabling a comprehensive view of the user's journey through the software platform. Each channel interaction is mapped to specific milestones, such as account creation, authentication, or continued engagement, and attribution weights are assigned to reflect the influence of each channel in guiding the user toward these goals. The stitching process ensures that previously fragmented or isolated interactions are correctly attributed, providing a more accurate and privacy-preserving assessment of channel effectiveness.

When the identity graph mutates—such as when new data reveals that multiple anonymous profiles should be merged into a single stitched identifier—the system triggers a per-identifier recomputation of the channel-milestone attribution graph. This mutation event prompts the attribution engine to recalculate the distribution of weights across all relevant channels and milestones for the affected profile. The recomputation may, in certain embodiments, be scoped to the specific stitched identifier, rather than requiring a global reprocessing of all user journeys. By dynamically updating the attribution graph in response to identity mutations, the system ensures that attribution remains accurate and reflective of the evolving structure of user interactions, even as new linkages are discovered and profiles are consolidated. This approach supports ongoing optimization and resource allocation based on the most current and complete view of user behavior.

Updating attribution weights based on metadata and other anonymous identifiers is a key aspect of preserving user privacy within the channel-milestone attribution system. Rather than relying on personally identifiable information (PII) such as names, email addresses, or persistent login credentials, the system utilizes non-PII signals—such as device type, browser characteristics, hashed tokens, referrer domains, and network attributes—to associate user interactions across sessions and devices. These metadata elements provide sufficient context to accurately stitch user journeys and assign attribution weights, while ensuring that sensitive personal data is never exposed or stored.

By operating exclusively on anonymized identifiers and metadata, the system prevents the reconstruction of individual user identities and mitigates the risk of unauthorized data access or misuse. The attribution engine processes only the minimum necessary information to link interactions and update channel weights, thereby maintaining compliance with privacy regulations such as the General Data Protection Regulation (GDPR) and the California Consumer Privacy Act (CCPA). This privacy-preserving approach enables robust multi-touch attribution and user journey analysis without compromising the confidentiality of user information.

Furthermore, the use of ephemeral or hashed identifiers ensures that even if data is intercepted or accessed outside the system, it cannot be traced back to specific individuals. The dynamic recalculation of attribution weights in response to identity graph mutations is performed using these privacy-safe signals, allowing the system to adapt to new data and evolving user profiles while upholding strict privacy standards. As a result, organizations can optimize channel performance and resource allocation with confidence that user privacy is protected throughout the attribution process.

FIG. 3 depicts an example of user interaction data, such as user data 204A-G shown in FIG. 2.

The user interaction data depicted in FIG. 3 corresponds to three unique users. Two of the users accessed the software platform multiple times across multiple sessions and/or devices. As a result, each user may be associated with multiple different user identifiers. However, according to embodiments disclosed herein, the multiple user identifiers may be stitched based on the IP address of the users.

The first user interacted with the software platform at three times (at 8:00 AM, 9:04 AM, and 9:08 AM). In the first interaction, the first user clicked on an advertisement to visit the software platform. The first user may have performed this action via a computing device such as the first user's phone. Then, one hour and four minutes later, the user performed an organic search for the software platform via a web browser. The first user may have performed this search via a computing device such as the first user's desktop computer. The user completed an authentication process to create or log in to a profile on the software platform in this interaction. Then, four minutes later, the user accessed a different element (e.g., a page) within the software environment by directly clicking on a link or other interactable element within the software platform. The first user completed a purchase as part of this interaction. The second and third interactions involving the first user are each associated with the same user identifier (verified user 1) because these interactions were each performed in the same session in which the user performed the authentication. Thus, the verified user identifier was applied at the second interaction and then not changed for the third interaction, since the user was still logged in. However, the first interaction involving the first user is associated with a different user identifier (anon_user_1). This is because the interaction occurred on a different device and before the user authenticated/logged in. Also, cookies could not be used to determine that the interaction that occurred at 8:00 AM was performed by the same user who interacted with the platform at 9:04 AM and 9:08 AM since the interactions were performed on separate devices. However, as described above, stitching may be used to stitch the data associated with the first user. For example, each interaction performed by the first user is associated with the same IP address (xx.xxx.xx.xxx). Based on sharing this IP address, the anonymous and verified identifiers for the first user may be stitched, such that the system understands that the interactions were performed by the same user.

The weights for the channels with which the first user interacted (advertisement A, the organic search link, and the direct link) may each be increased based on the first user performing a milestone (here, completing a purchase and authenticating). The weights for advertisement A may be increased based on advertisement A being the origin of the user, and the weights for the organic search link and the direct link may be increased based on these channels being associated with milestones (authentication and completing a purchase). Even if the organic search link was only associated with a visit instead of an authentication, the weight of the organic search link would still be increased (but, in some cases, by a smaller amount than an increase that would occur based on the organic search link being associated with a milestone) since the organic search link is intermediate to the origin and the milestone. In other words, the organic search link is part of the chain of interactions that led to the milestone, so the weight of the organic search link would be increased even if the organic search link were not directly associated with a milestone.

The second user interacted with the software platform at 8:15 AM by clicking on advertisement B. Then, at 9:45 AM, the second user performed an organic web search to follow a web search link to the software platform and perform an authentication (e.g., creating or signing in to a profile). The first interaction and the second interaction involving the second user may have been performed using the same computing device. However, cookies may have been blocked at the second user's computing device. As a result, the interactions of the second user are associated with two different user identifiers (anon_user_2 and verified user 2). As described above, the identifiers may be stitched based on the user's IP address (yy.yyy.yy.yyy). Alternatively, since the user performed the interactions on the same device, the interactions may be stitched based on a device identifier associated with the device. Since the interactions led to a milestone (authentication), the weights of each channel (advertisement B and the organic search link) may be increased.

The third user interacted with the software platform at 10:00 AM by clicking on advertisement C. However, the third user did not interact with the software platform again and did not perform a milestone. As a result, the weight associated with advertisement C may not be increased. In some embodiments, the weight for advertisement C may be increased based on advertisement C being a user origin. However, the increase may not be as large as an increase that would have occurred if the third user had completed a milestone. In certain embodiments, the weight of advertisement C is decreased based on the third user failing to complete a milestone.

In an example, the interaction of the third user may not be stitched because no other user interaction data was associated with the same IP address (zz.zzz.zz.zzz) However, in an alternate example, the interaction of the third user may not be stitched because more than a threshold amount of devices were associated with the same IP address. For example, if a large number of device identifiers are associated with a single IP address, this may indicate that the IP address is for a public internet connection. As a result, several different users may use the internet connection, so the IP address has little value in determining that two interactions were made by the same user. In cases where multiple user interactions and a large number of devices are associated with an IP address, user interactions may be stitched based on the interactions sharing a device identifier.

In FIG. 3, the user interaction data illustrates scenarios where multiple sessions and identifiers are associated with a single user. Initially, the first user interacts with the software platform through different channels and devices, resulting in separate identifiers-anon_user_1 for the anonymous session and verified user 1 for the authenticated session. These identifiers are linked by contextual information such as a shared IP address, which allows the stitching component to determine that both sets of data correspond to the same individual.

Once anon_user_1 is stitched into verified user 1, the attribution engine initiates a recomputation of the channel-milestone attribution graph for this unified profile. The recomputation process aggregates all channel interactions previously associated with both the anonymous and authenticated identifiers. This means that the user's initial engagement with the platform, which may have occurred anonymously, is now recognized as part of the complete user journey leading up to key milestones such as authentication and purchase.

During this recomputation, attribution weights for each channel are recalculated to reflect the newly unified sequence of interactions. For example, the channel through which the user first accessed the platform as anon_user_1-such as an external link or a specific page-now receives appropriate credit for initiating the user's journey. Similarly, intermediate channels and the final channel associated with the milestone event (e.g., authentication or purchase) are assigned updated weights based on their roles in the stitched journey. This dynamic adjustment ensures that the influence of each channel is accurately represented, taking into account both anonymous and authenticated interactions.

By recomputing attribution weights in response to the stitching of anon_user_1 into verified user 1, the system provides a more comprehensive and privacy-preserving assessment of channel effectiveness. The recalculation is scoped to the affected stitched identifier, allowing the attribution graph to evolve as new linkages are discovered. This approach not only improves the accuracy of attribution but also supports ongoing optimization of channel strategies, ensuring that resource allocation decisions are based on the most complete and current view of user behavior.

Example Operations Related to Cross-Channel Tracking and Attribution

Figure 4:
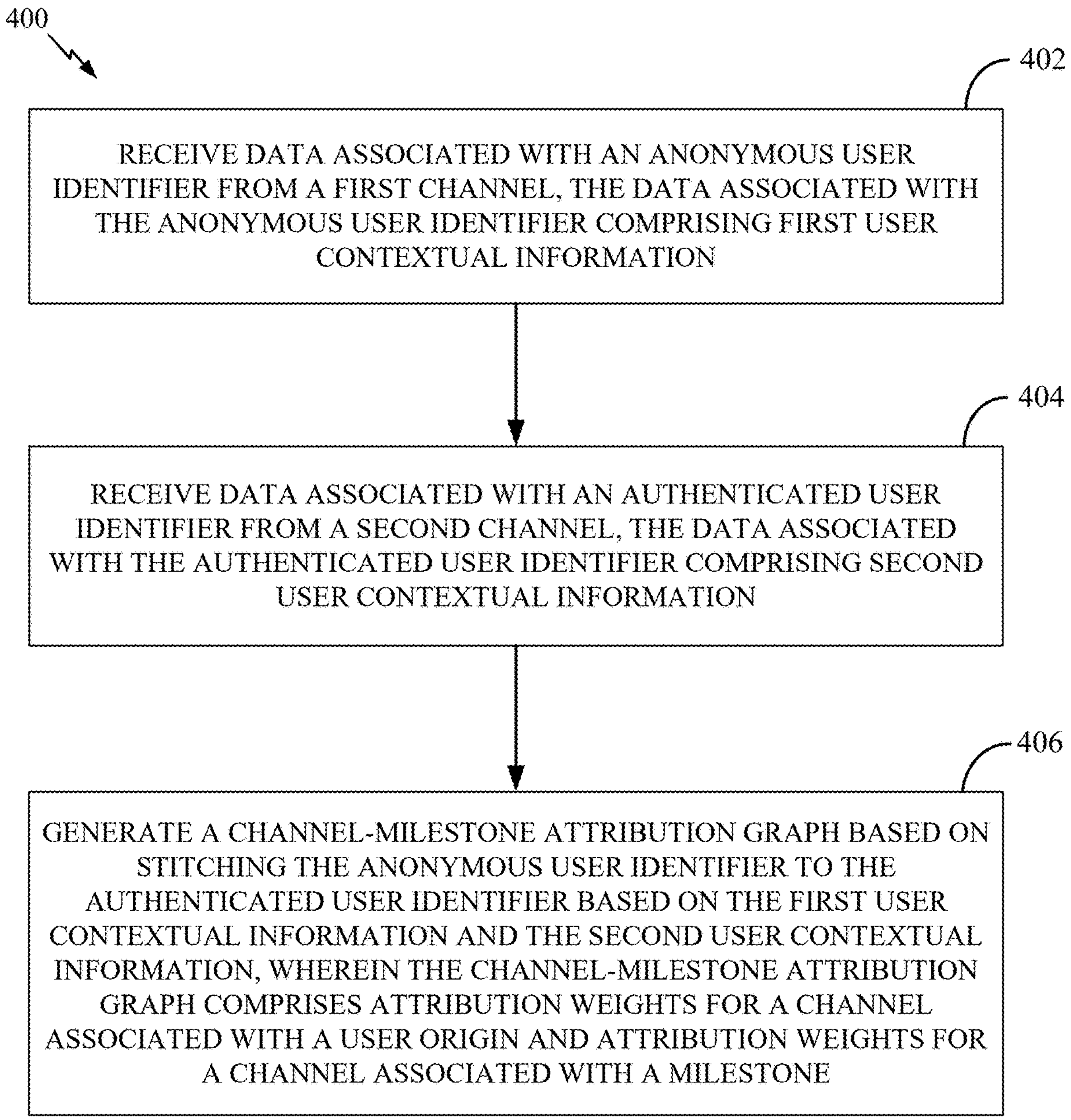
FIG. 4 depicts example operations related to cross-channel tracking and attribution.

FIG. 4 depicts example operations 400 related to cross-channel tracking and attribution. For example, operations 400 may be performed by one or more of the components described with respect to FIG. 1 and FIG. 2.

Operations 400 begin at step 402 with receiving data associated with an anonymous user identifier from a first channel, the data associated with the anonymous user identifier comprising first user contextual information.

Operations 400 continue at step 404 with receiving data associated with an authenticated user identifier from a second channel, the data associated with the authenticated user identifier comprising second user contextual information. Certain embodiments provide that the first channel is the channel associated with the user origin; and the second channel is an intermediate channel between the first channel and the channel associated with the target goal. Some embodiments provide that the first user contextual information and the second user contextual information comprise a device identifier or an internet protocol address.

Operations 400 continue at step 406 with generating a channel-milestone attribution graph based on stitching the anonymous user identifier to the authenticated user identifier based on the first user contextual information and the second user contextual information, wherein the channel-milestone attribution graph comprises attribution weights for a channel associated with a user origin and attribution weights for a channel associated with a milestone. In some embodiments, the channel-milestone attribution graph comprises attribution weights for each channel that are based on the user origin and the milestone. In certain embodiments, an attribution weight of the first channel is higher than an attribution weight of the second channel based on the first channel being the channel associated with the user origin.

According to some embodiments, Operations 400 further include receiving data associated with a given user identifier, the data associated with the given user identifier comprising a given internet protocol address; receiving data associated with a particular user identifier, the data associated with the particular user identifier comprising the given internet protocol address; and determining not to stitch the given user identifier to the particular user identifier based on the given internet protocol address being associated with more than a threshold amount of device identifiers.

According to some embodiments, Operations 400 further include performing an intervention with respect to a channel based on the channel attribution graph

Example of a Processing System for Cross-Channel Tracking and Attribution

Figure 5:
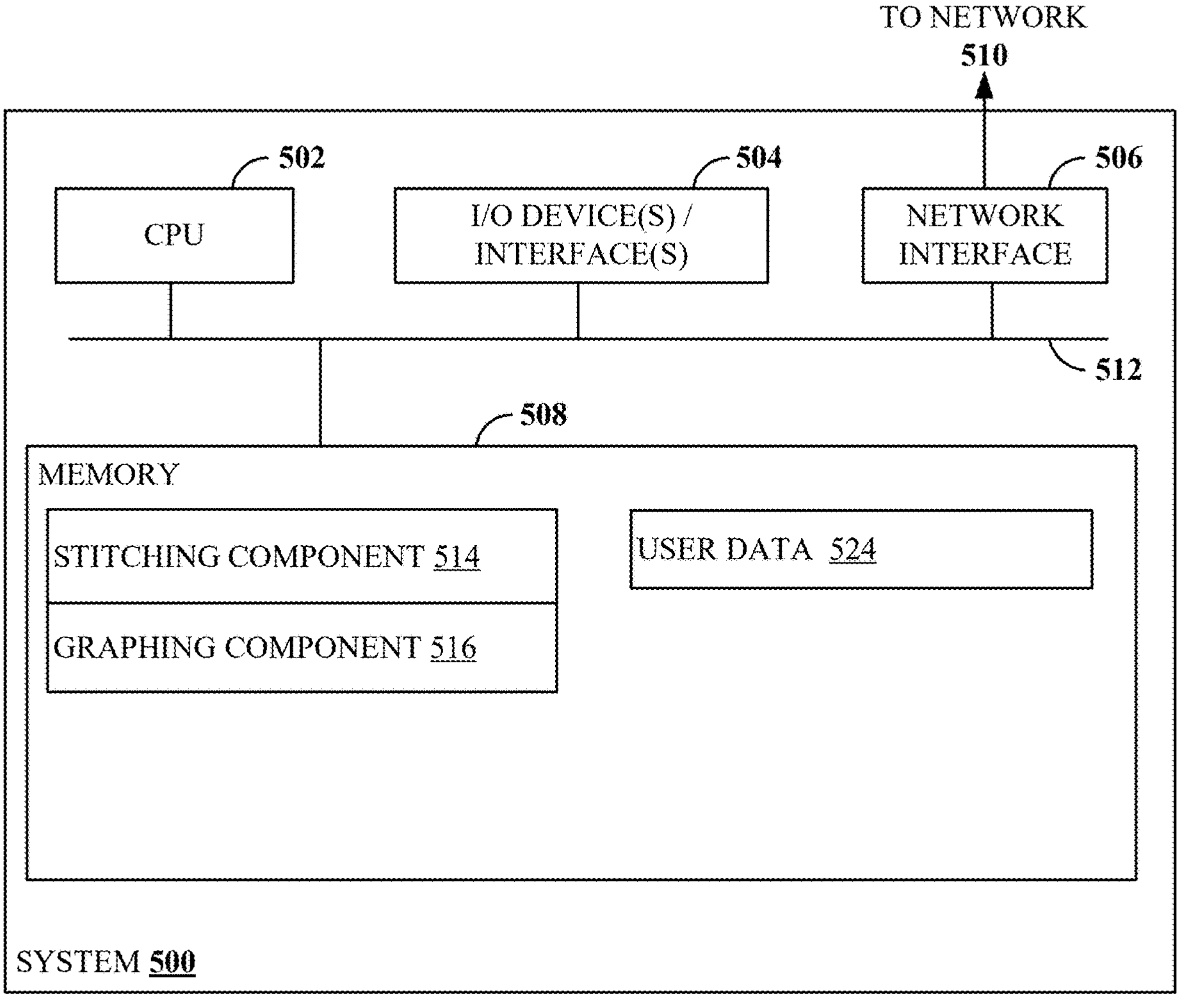
FIG. 5 depicts an example of a processing system for cross-channel tracking and attribution.

FIG. 5 illustrates an example system 500 with which embodiments of the present disclosure may be implemented. For example, system 500 may be configured to perform operations 400 of FIG. 4 and/or to implement one or more components as in FIG. 1 or FIG. 2.

System 500 includes a central processing unit (CPU) 502, one or more I/O device interfaces that may allow for the connection of various I/O devices 504 (e.g., keyboards, displays, mouse devices, pen input, etc.) to the system 500, network interface 506, a memory 508, and an interconnect 512. It is contemplated that one or more components of system 500 may be located remotely and accessed via a network 510. It is further contemplated that one or more components of system 500 may comprise physical components or virtualized components.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, and memory 508. CPU 502 is included to be representative of a single CPU, multiple CPUs, a single CPU having multiple processing cores, and other arrangements.

Additionally, the memory 508 is included to be representative of a random access memory or the like. In some embodiments, memory 508 may comprise a disk drive, solid state drive, or a collection of storage devices distributed across multiple storage systems. Although shown as a single unit, the memory 508 may be a combination of fixed and/or removable storage devices, such as fixed disc drives, removable memory cards or optical storage, network attached storage (NAS), or a storage area-network (SAN).

As shown, memory 508 includes stitching component 514, which may be representative of stitching component 120 of FIG. 1 or FIG. 2. Memory 508 further comprises graphing component 516, which may correspond to graphing component 130 of FIG. 1 or FIG. 2. Memory 508 further comprises user data 524 which may correspond to user data 204A-G of FIG. 2.

It is noted that in some embodiments, system 500 may interact with one or more external components, such as via network 510, in order to retrieve data and/or perform operations.

Additional Considerations

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computing system, comprising:

one or more processors communicatively coupled to a first remote channel and a second remote channel via a network, wherein the first remote channel comprises a first interactable web entity associated with a user origin and the second remote channel comprises a second interactable web entity; and a memory comprising instructions that, when executed by the one or more processors, cause the computing system to:

receive data associated with an anonymous user identifier from the first remote channel, the data associated with the anonymous user identifier comprising first user contextual information, wherein the first user contextual information comprises a device identifier or an internet protocol address;

receive data associated with an authenticated user identifier from the second remote channel, the data associated with the authenticated user identifier comprising second user contextual information, wherein the second user contextual information comprises the device identifier or the internet protocol address; and generate a channel-milestone attribution graph based on stitching the anonymous user identifier to the authenticated user identifier based on the first user contextual information and the second user contextual information, wherein the channel-milestone attribution graph comprises:

a node that represents the first remote channel, a node that represents a milestone, and a node that represents the second remote channel; and attribution weights for the node that represents the first remote channel and the node that represents the second remote channel, wherein an attribution weight for the node that represents the second remote channel is determined according to a U-Based model or a Markov chain that propagates an increase in attribution weights for all nodes along a path in the attribution graph associated with reaching the milestone.

2. The computing system of claim 1, wherein the instructions further cause the computing system to:

receive data associated with a stitched user identifier, the data associated with the stitched user identifier comprising data associated with multiple anonymous identifiers that were determined to be associated with a same user;

receive data associated with a particular user identifier, the data associated with the particular user identifier comprising a given internet protocol address contained within the data associated with the stitched identifier; and determine not to stitch the particular user identifier to the stitched user identifier based on the given internet protocol address being associated with more than a threshold amount of device identifiers.

3. The computing system of claim 1, wherein an intervention is performed with respect to a channel based on the channel attribution graph.

4. The computing system of claim 1, wherein:

the second remote channel is an intermediate channel between the first remote channel and the channel associated with the milestone.

5. The computing system of claim 4, wherein the channel-milestone attribution graph comprises attribution weights for each channel that are based on the user origin and the milestone.

6. The computing system of claim 5, wherein an attribution weight of the first remote channel is higher than an attribution weight of the second remote channel based on the first remote channel being the channel associated with the user origin.

7. A method, comprising:

receiving data associated with an anonymous user identifier from a first channel associated with a user origin, the data associated with the anonymous user identifier comprising first user contextual information;

receiving data associated with an authenticated user identifier from a second channel, the data associated with the authenticated user identifier comprising second user contextual information; and generating a channel-milestone attribution graph based on stitching the anonymous user identifier to the authenticated user identifier based on the first user contextual information and the second user contextual information, wherein the channel-milestone attribution graph comprises;

a node that represents the first channel, a node that represents a milestone, and a node that represents the second channel; and attribution weights for the node that represents the first channel and the node that represents the second channel, wherein an attribution weight for the node that represents the second channel is determined according to a U-Based model or a Markov chain that propagates an increase in attribution weights for all nodes along a path in the attribution graph associated with reaching the milestone.

8. The method of claim 7, further comprising:

receiving data associated with a stitched user identifier, the data associated with the stitched user identifier comprising data associated with multiple anonymous identifiers that were determined to be associated with a same user;

receiving data associated with a particular user identifier, the data associated with the particular user identifier comprising a given internet protocol address contained within the data associated with the stitched identifier; and determining not to stitch the particular user identifier to the stitched user identifier based on the given internet protocol address being associated with more than a threshold amount of device identifiers.

9. The method of claim 7, further comprising performing an intervention with respect to a channel based on the channel attribution graph.

10. The method of claim 7, wherein:

the second channel is an intermediate channel between the first channel and the channel associated with the milestone.

11. The method of claim 10, wherein the channel-milestone attribution graph comprises attribution weights for each channel that are based on the user origin and the milestone.

12. The method of claim 11, wherein an attribution weight of the first channel is higher than an attribution weight of the second channel based on the first channel being the channel associated with the user origin.

13. The method of claim 7, wherein the first user contextual information and the second user contextual information comprise a device identifier or an internet protocol address.

14. The method of claim 7, wherein the channel-milestone attribution graph is the U-based model, the U-based model increases the attribution weight for the node that represents the second channel based on a distance of the node that represents the second channel from:

the node that represents the milestone in the channel-milestone attribution graph; and the node that represents the first channel.

15. The method of claim 7, wherein the channel-milestone attribution graph is the U-based model, the U-based model causes the attribution weight for the node that represents the second channel to either:

increase as a number of nodes between the node that represents the second channel and the node that represents the first channel decreases; or increase as a number of nodes between the node that represents the second channel and the node that represents the milestone decreases.

16. A system, comprising:

one or more processors; and a memory comprising instructions that, when executed by the one or more processors, cause the system to:

receive data associated with an anonymous user identifier from a first channel associated with a user origin, the data associated with the anonymous user identifier comprising first user contextual information;

receive data associated with an authenticated user identifier from a second channel, the data associated with the authenticated user identifier comprising second user contextual information; and generate a channel-milestone attribution graph based on stitching the anonymous user identifier to the authenticated user identifier based on the first user contextual information and the second user contextual information, wherein the channel-milestone attribution graph comprises:

a node that represents the first channel, a node that represents a milestone, and a node that represents the second channel; and attribution weights for the node that represents the first channel and the node that represents the second channel, wherein an attribution weight for the node that represents the second channel is determined according to a U-Based model or a Markov chain that propagates an increase in attribution weights for all nodes along a path in the attribution graph associated with reaching the milestone.

17. The system of claim 16, wherein the instructions further cause the system to:

receive data associated with a stitched user identifier, the data associated with the stitched user identifier comprising data associated with multiple anonymous identifiers that were determined to be associated with a same user;

receive data associated with a particular user identifier, the data associated with the particular user identifier comprising a given internet protocol address contained within the data associated with the stitched identifier; and determine not to stitch the particular user identifier to the stitched user identifier based on the given internet protocol address being associated with more than a threshold amount of device identifiers.

18. The system of claim 16, wherein an intervention is performed with respect to a channel based on the channel attribution graph.

19. The system of claim 16, wherein:

the second channel is an intermediate channel between the first channel and the channel associated with the milestone.

20. The system of claim 19, wherein the channel-milestone attribution graph comprises attribution weights for each channel that are based on the user origin and the milestone.

* * * * *